US008902928B2

(12) United States Patent
Seyedi-Esfahani et al.

(10) Patent No.: US 8,902,928 B2
(45) Date of Patent: Dec. 2, 2014

(54) SYSTEM AND METHOD FOR EFFICIENT TRANSMISSION OF MULTIMEDIA AND DATA

(75) Inventors: Seyed-Alireza Seyedi-Esfahani, Fairport, NY (US); Dagnachew Birru, Yorktown Heights, NY (US)

(73) Assignee: Koninklijke Philips N.V., Eindhoven (NL)

( * ) Notice: Subject to any disclaimer, the term of this patent is extended or adjusted under 35 U.S.C. 154(b) by 147 days.

(21) Appl. No.: 12/522,940

(22) PCT Filed: Jan. 16, 2008

(86) PCT No.: PCT/IB2008/050162
§ 371 (c)(1),
(2), (4) Date: Jul. 13, 2009

(87) PCT Pub. No.: WO2008/087599
PCT Pub. Date: Jul. 24, 2008

(65) Prior Publication Data
US 2010/0040084 A1    Feb. 18, 2010

Related U.S. Application Data

(60) Provisional application No. 60/885,149, filed on Jan. 16, 2007.

(51) Int. Cl.
*H04J 3/24* (2006.01)
*H04L 1/00* (2006.01)

(52) U.S. Cl.
CPC .............. *H04L 1/0089* (2013.01); *H04L 1/007* (2013.01); *H04L 1/0041* (2013.01); *H04L 1/0075* (2013.01); *H04L 2001/0098* (2013.01); *H04L 1/0061* (2013.01)

USPC ........................... 370/474; 370/389; 370/473

(58) Field of Classification Search
USPC ......... 370/371–374, 468, 394, 389, 392, 445, 370/476, 469, 471, 473, 348, 474, 229, 370/242; 710/30; 709/249; 375/229; 340/7.21; 348/723
See application file for complete search history.

(56) References Cited

U.S. PATENT DOCUMENTS 5,337,313 A * 8/1994 Buchholz et al. ............. 370/394
5,838,678 A * 11/1998 Davis et al. ................... 370/389
(Continued)

FOREIGN PATENT DOCUMENTS

EP        1528693 A2      5/2005
WO    WO2005112354 A1    11/2005

*Primary Examiner* — Michael Thier
*Assistant Examiner* — Vincelas Louis
(74) *Attorney, Agent, or Firm* — Larry Liberchuk

(57) ABSTRACT

A system and method for efficient transmission of different types of source data in the same packet, hence, enabling efficient transmission of multimedia and data content with unequal error protection are provided. The present packet structure is defined wherein the packet consists of a number of segments or payloads. The packet includes a field indicative of a number of payloads included in the packet; and at least one data field for each payload in the packet, the at least one data field defining at least one characteristic of the payload. The at least one data field includes a length of the payload, modulation and coding scheme, existence of a frame check sum (FCS), and existence of a midamble. The at least one data field may further include a continuation element indicative of whether two consecutive payloads are portions of a same data frame.

15 Claims, 4 Drawing Sheets

(56) References Cited

U.S. PATENT DOCUMENTS

| | | | |
|---|---|---|---|
| 6,079,566 A * | 6/2000 | Eleftheriadis et al. | 1/1 |
| 6,084,888 A * | 7/2000 | Watanabe et al. | 370/473 |
| 6,108,520 A * | 8/2000 | Wong et al. | 340/7.21 |
| 6,574,193 B1 * | 6/2003 | Kinrot | 370/229 |
| 7,289,535 B2 * | 10/2007 | Odman | 370/473 |
| 7,308,003 B2 * | 12/2007 | Lev et al. | 370/474 |
| 7,447,232 B2 * | 11/2008 | Stephens et al. | 370/471 |
| 8,306,060 B2 * | 11/2012 | Ngo et al. | 370/473 |
| 8,339,967 B2 * | 12/2012 | Kwon et al. | 370/242 |
| 2002/0131486 A1 * | 9/2002 | Haartsen | 375/229 |
| 2003/0169769 A1 * | 9/2003 | Ho et al. | 370/473 |
| 2003/0185239 A1 | 10/2003 | Miller | |
| 2003/0210710 A1 * | 11/2003 | Odman | 370/471 |
| 2004/0249974 A1 * | 12/2004 | Alkhatib et al. | 709/245 |
| 2005/0025187 A1 * | 2/2005 | Li et al. | 370/476 |
| 2005/0152358 A1 * | 7/2005 | Giesberts et al. | 370/389 |
| 2005/0169261 A1 * | 8/2005 | Williams et al. | 370/389 |
| 2006/0013255 A1 * | 1/2006 | Kuskin | 370/473 |
| 2006/0078001 A1 * | 4/2006 | Chandra et al. | 370/473 |
| 2006/0153232 A1 * | 7/2006 | Shvodian | 370/468 |
| 2006/0195629 A1 * | 8/2006 | Sharma et al. | 710/30 |
| 2007/0030848 A1 * | 2/2007 | Miyata et al. | 370/389 |
| 2008/0095189 A1 * | 4/2008 | Frazier et al. | 370/469 |
| 2008/0129879 A1 * | 6/2008 | Shao et al. | 348/723 |
| 2008/0130617 A1 * | 6/2008 | Singh et al. | 370/345 |
| 2009/0141723 A1 * | 6/2009 | Giesberts et al. | 370/392 |
| 2010/0232452 A1 * | 9/2010 | Takagi et al. | 370/445 |

* cited by examiner

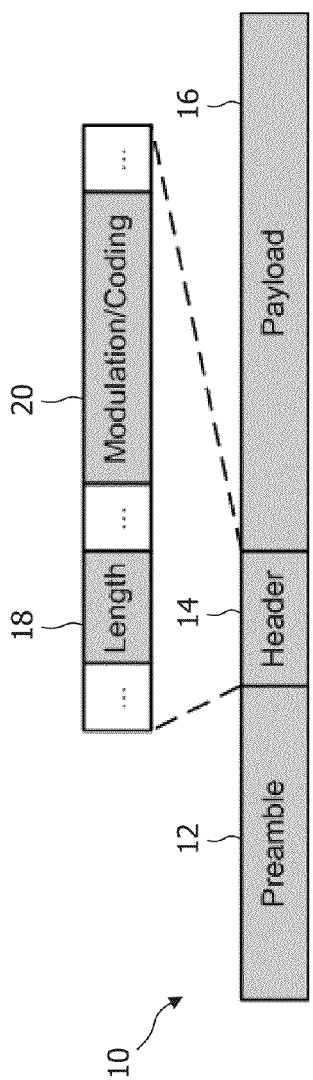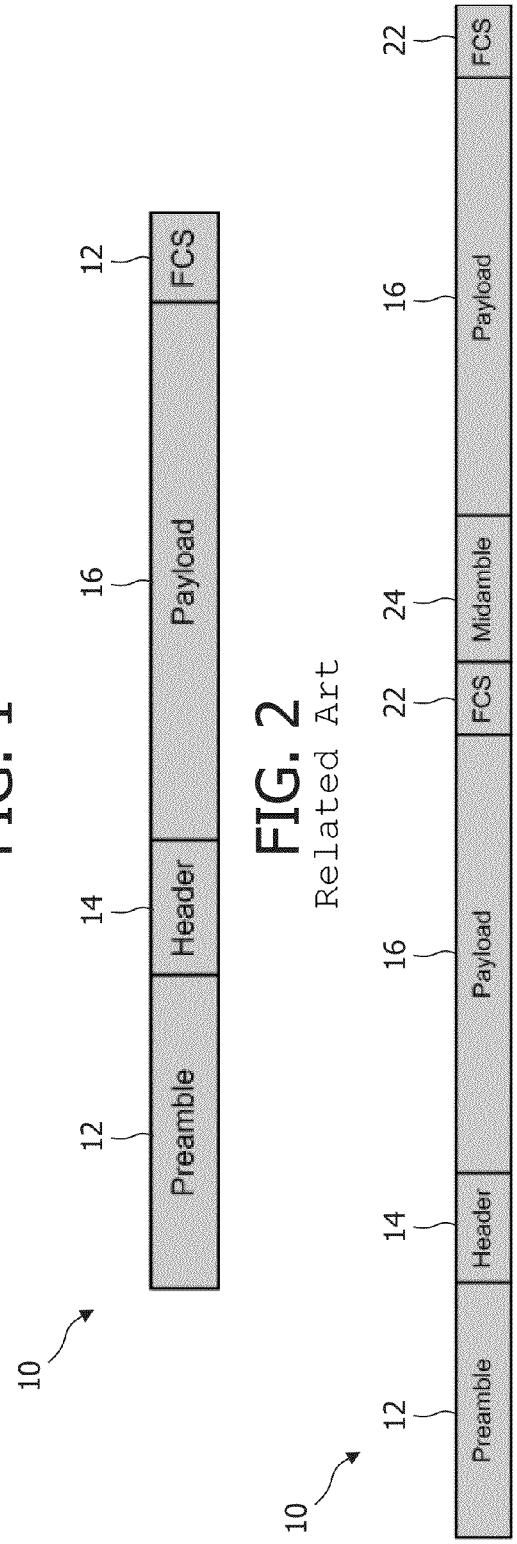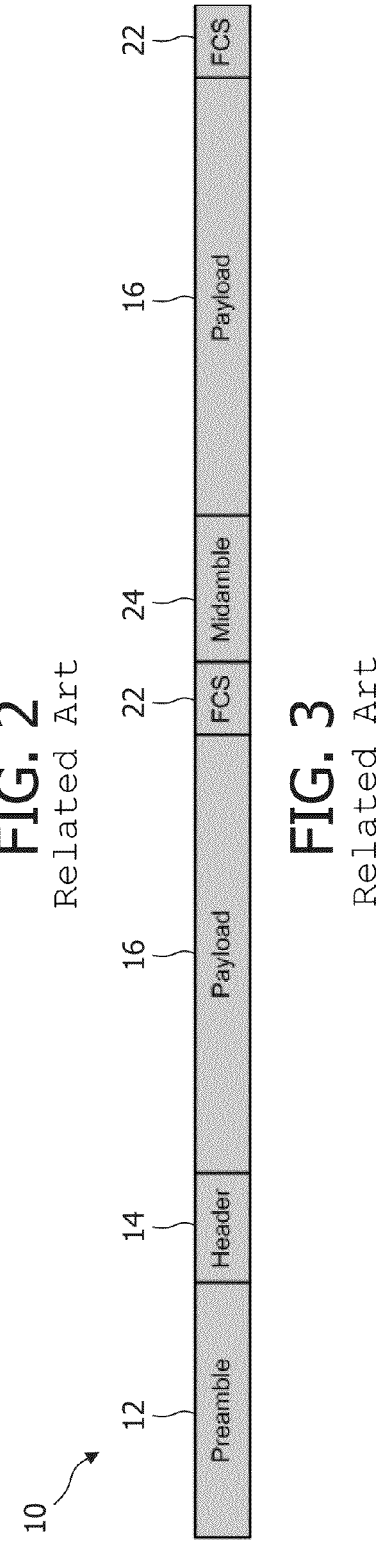
FIG. 1
FIG. 2
Related Art
FIG. 3
Related Art

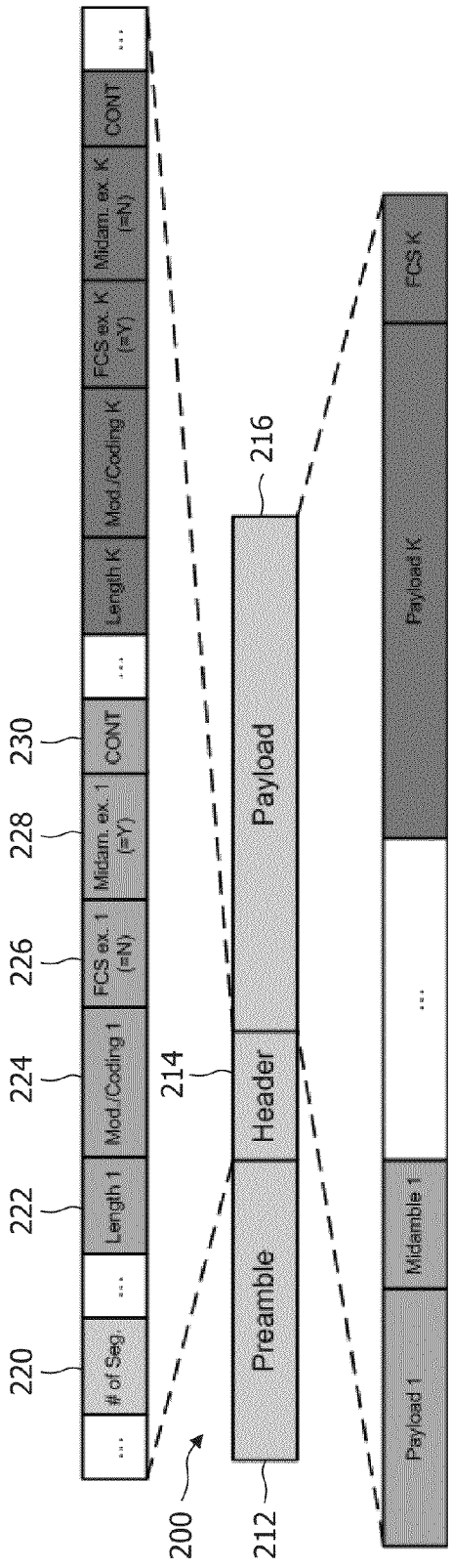
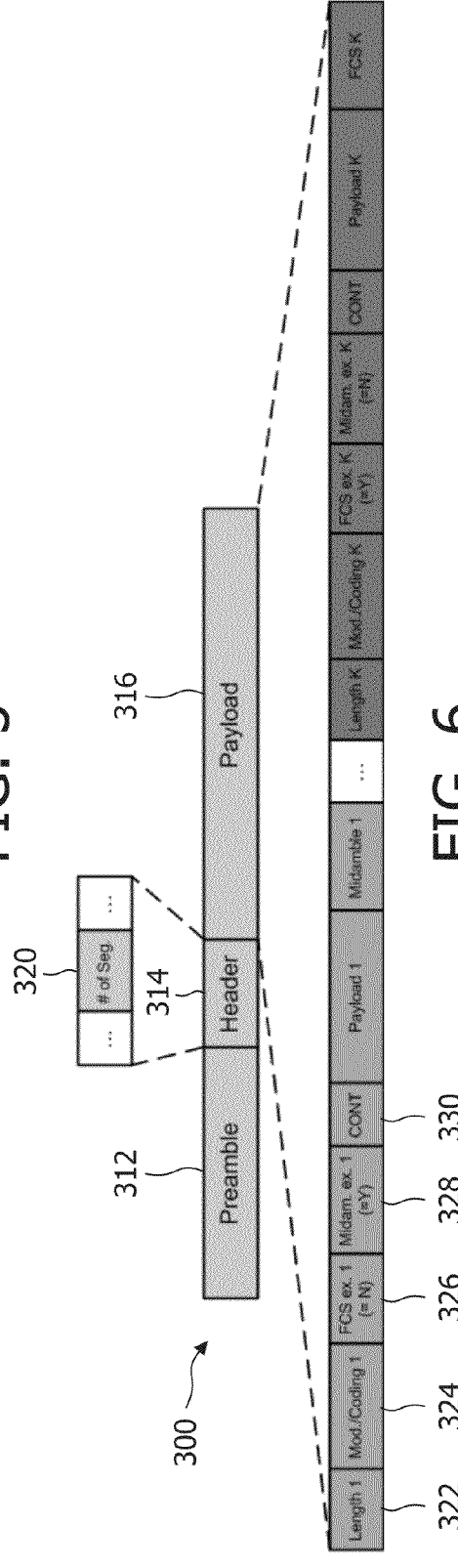
FIG. 5
FIG. 6

SYSTEM AND METHOD FOR EFFICIENT TRANSMISSION OF MULTIMEDIA AND DATA

CROSS REFERENCE TO RELATED APPLICATIONS

This application claims the benefit of prior filed, U.S. provisional application: Ser. No. 60/885,149, filed on Jan. 16, 2007.

BACKGROUND OF THE INVENTION

1. Field of the Invention

The present disclosure generally relates to data communications and data communications systems, and more particularly, to a system and method for efficient transmission of multimedia and data.

2. Description of the Related Art

In many communication systems, data is transmitted in packets (also known as frames). Referring to FIG. 1, a packet 10 often consists of a preamble 12, a header 14 and the payload 16. The preamble 12 is often used for synchronization, channel estimation or for clear channel assessment. The header 14 usually contains data such as source and destination, the length of the payload 18, modulation and coding type 20, etc. Since the correct detection of the information is often essential to receive and deliver the payload, the header 14 is usually heavily protected with different types of redundancy such as a Forward Error Correcting (FEC) code.

When the correct delivery of payload needs to be guaranteed, often a retransmission scheme is used. In other words, a error detecting code (such as a Cyclic Redundancy Check or CRC) is used. Parity bits are calculated at the transmitter and are included in the packet in a data field often called Frame Check Sum or FCS, as illustrated in FIG. 2. At the receiver these parity bits are used to determine whether an error has occurred in the payload. In case of errors, the receiver will ask the transmitter to retransmit all or part of the packet. When correct delivery of data does not need to be guaranteed ("best effort") the use of such method is not needed.

Normally, the preamble is used for synchronization, channel estimation, and frequency offset estimation. However, when the packet is long, the information estimated during the preamble may no longer be up-to-date when nearing the end of the packet. In this case, a midamble 24 can be placed in the middle of the packet to assist the updating of the channel and frequency offset estimation as well as re-synchronization, as shown In FIG. 3.

In many communication systems, different types of data are needed to be communicated. These different types of data often have different requirements on the error rate, and tolerable delay. As a result, different modulation and coding should be used for different types of data. For example, in the transmission of multimedia, often video, audio, security (encryption) information and control information need to be transmitted. Aside from these different sources, even different data bits from one source (e.g. video) could have different requirements of the error rate.

Hence, it is desirable that different modulation and coding schemes are employed such that different protection levels are provided for the data with different levels of sensitivity. In a conventional packet structure, only one type of modulation and coding can be used. Hence, the different types of data must be transmitted using different packets. This will increase the packet overhead (preamble, header and inter packet guard times), and reduces the efficiency of the system.

Therefore, a need exists for techniques for generating a data packet of different types of source data in the same packet enabling efficient transmission of multimedia and data content.

SUMMARY OF THE INVENTION

A system and method for efficient transmission of different types of source data in the same packet, hence, enabling efficient transmission of multimedia and data content with unequal error protection are provided. The present disclosure defines a packet structure where the packet consists of a number of segments or payloads. Each segment may have different length, modulation and coding. Also, each segment may contain error detection code parity bits (FCS). Furthermore, each segment may or may not include a midamble at its beginning or at its end. Also, other characteristics of each segment may also be different. The length, modulation and coding method for each segment, as well as whether the segment includes FCS or a midamble, or its other characteristics, will be specified in one or more information fields in the packet.

According to one aspect of the present disclosure, a data transmission system for transmitting multimedia and data includes means for generating a packet of data including a preamble, header and at least one payload; means for inserting in the packet a field indicative of a number of payloads included in the packet; and means for inserting in the packet at least one data field for each payload in the packet, the at least one data field defining at least one characteristic of the payload.

In a related aspect, the at least one data field defining at least one characteristic of the payload includes a length of the payload, modulation and coding scheme, existence of a frame check sum (FCS), and existence of a midamble.

In a further related aspect, the at least one data field defining at least one characteristic of the payload is a continuation element indicative of whether two consecutive payloads are portions of a same data frame.

According to another aspect of the present disclosure, a method for generating a data packet including multimedia and data is provided. The method includes generating a packet of data including a preamble, header and at least one payload; inserting in the packet a field indicative of a number of payloads included in the packet; and inserting in the packet at least one data field for each payload in the packet, the at least one data field defining at least one characteristic of the payload.

According to a further aspect of the present disclosure, a data packet for transmitting multimedia and data including a preamble, header and at least one payload is provided. The data packet includes a field indicative of a number of payloads included in the packet; and at least one data field for each payload in the packet, the at least one data field defining at least one characteristic of the payload.

BRIEF DESCRIPTION OF THE DRAWINGS

These, and other aspects, features and advantages of the present disclosure will be described or become apparent from the following detailed description of the preferred embodiments, which is to be read in connection with the accompanying drawings.

FIG. 1 is an exemplary illustration of a conventional data packet structure;

FIG. 2 is an illustration of the data packet of FIG. 1 including a frame check sum (FCS) data field;

FIG. 3 is an illustration of the data packet of FIG. 1 including a frame check sum (FCS) data field and a midamble;

FIG. 5 is an illustration of a data packet structure in accordance with an embodiment of the present disclosure;

FIG. 6 is an illustration of a data packet structure in accordance with another embodiment of the present disclosure.

Figure 4:
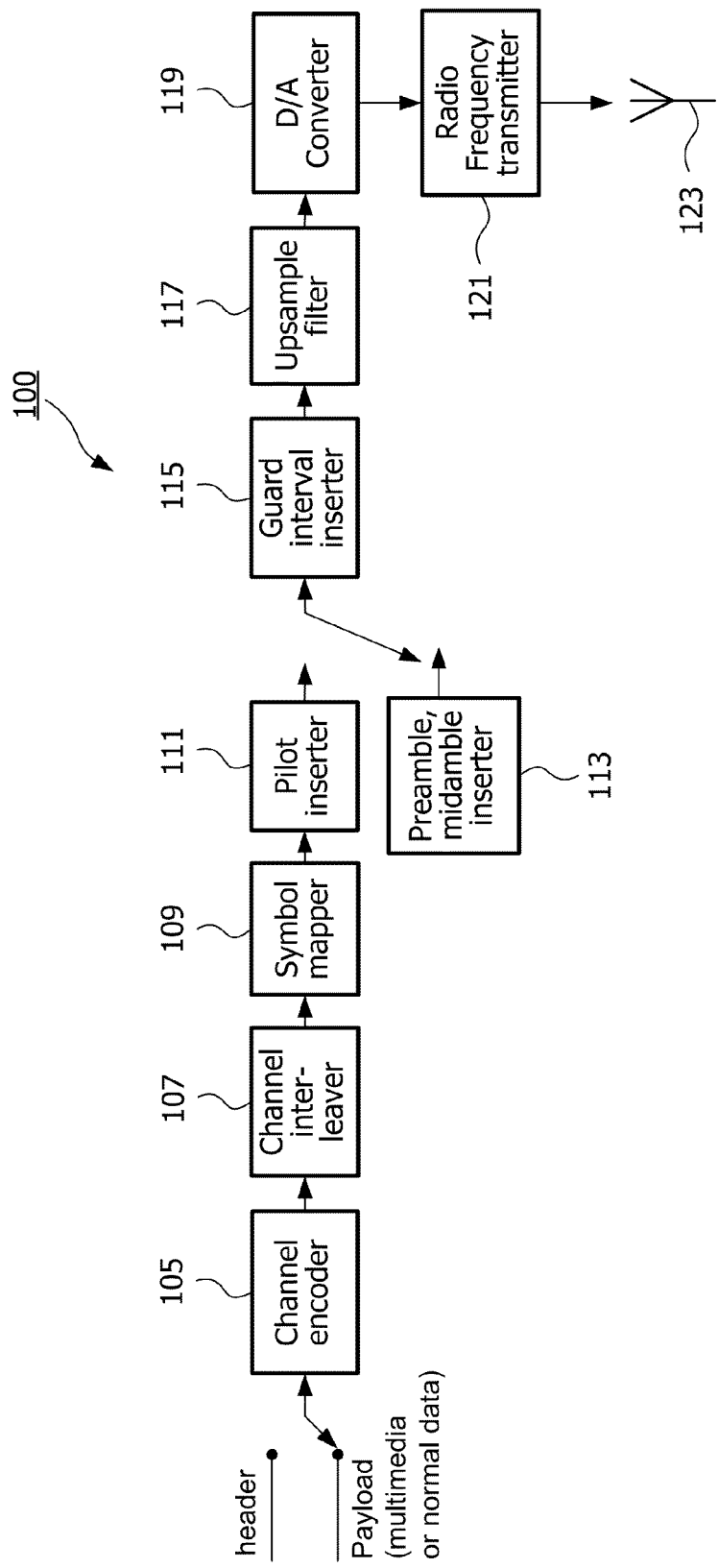
FIG. 4 is a diagram of an exemplary communication system in accordance with an embodiment of the present disclosure.

It should be understood that the drawing(s) is for purposes of illustrating the concepts of the disclosure and is not necessarily the only possible configuration for illustrating the disclosure.

DETAILED DESCRIPTION OF PREFERRED EMBODIMENTS

It should be understood that the elements shown in the FIGS. may be implemented in various forms of hardware, software or combinations thereof. Preferably, these elements are implemented in a combination of hardware and software on one or more appropriately programmed general-purpose devices, which may include a processor, memory and input/output interfaces.

The present description illustrates the principles of the present disclosure. It will thus be appreciated that those skilled in the art will be able to devise various arrangements that, although not explicitly described or shown herein, embody the principles of the disclosure and are included within its spirit and scope.

All examples and conditional language recited herein are intended for pedagogical purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read only memory ("ROM") for storing software, random access memory ("RAM"), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

A system and method for efficient transmission of different types of source data in the same packet, hence, enabling efficient transmission of multimedia and data content with unequal error protection are provided. The present disclosure defines a packet structure where the packet consists of a number of segments or payloads. Each segment may have different length, modulation and coding. Also, each segment may contain error detection code parity bits (FCS). Furthermore, each segment may or may not include a midamble at its beginning or at its end. Also, other characteristics of each segment may also be different. The length, modulation and coding method for each segment, as well as whether the segment includes FCS or a midamble, or its other characteristics, will be specified in one or more information fields in the packet.

Transmitter

FIG. 4 is a functional block diagram of an example embodiment of a data transmitter 100 configured in accordance with the present disclosure. This is but one example embodiment and it is contemplated that one of ordinary skill in the art may enable other embodiments that do not depart from the scope of the present disclosure. As will be appreciated by those skilled in the art, the various functions shown in FIG. 4 may be physically implemented using a software-controlled microprocessor, hard-wired logic circuits, or a combination thereof. Also, while the functional blocks are illustrated as being segregated in FIG. 4 for explanation purposes, they may be combined in any physical implementation.

As shown, inputs are provided from multiple data sources or streams, including, for example, payload data 16 and header data 14. Channel Encoder 105 includes a demultiplexer or switch for selectively inputting one of the payload data or header data.

The channel encoder 105 channel-encodes the selected data stream according to a coding method. The channel encoder 105 can be a block encoder, a convolutional encoder, a turbo encoder, or some combination thereof including a concatenated code.

The output of the channel encoder 105 is coupled to a channel interleaver 107 which interleaves the coded data according to an interleaving method. While not shown in FIG.

4, it is clear that a rate matcher including a repeater and a puncturer can reside between the channel encoder 105 and the channel interleaver 107.

Data symbols output from the channel interleaver 107 are then sent to a pilot inserter 111 where pilot symbols are inserted among the data symbols. The pilot inserter 111 generates pilot symbols which may be used to facilitate receiver detection of the transmitted signal. As shown, preamble, midamble inserter 113 includes a demultiplexer or switch for selectively providing a midamble and/or preamble among the data symbols. A more detailed description of the insertion of midamble and preamble symbol insertion is discussed further below with reference to FIG. 5-7.

The data symbols are then passed to a guard interval inserter 115 to add prefixes to the data symbols. The data symbols are then passed through an upsample filter 117, a digital-to-analog converter 119 and a radio frequency (RF) transmitter 121 which transmits the data symbols as a signal through a transmitting antenna 123.

The system 100 described above will generate and transmit a data packet including multimedia and data content in accordance with the present disclosure.

In accordance with the present disclosure, the packet will consist of a number of segments. Each segment may have different length, modulation and coding. Also, each segment may contain error detection code parity bits (FCS). Furthermore, each segment may or may not include a midamble at its beginning or at its end. Furthermore, other characteristics of each segment may also be different. The length, modulation and coding method for each segment, as well as whether the segment includes FCS or a midamble, or its other characteristics, will be specified in one or more information fields in the packet.

Referring now to FIG. 5, in one embodiment of the present disclosure, a field 220 in the header 214 will specify the number of segments in the packet 200, K. This will be followed by K fields each containing length 222, modulation and coding scheme 224 as well as the existence of FCS 226 (FCS ex.) and midamble 228 (Midam. Ex.). Furthermore, another information element (CONT) 230 may exist that determines whether two consecutive segments are portions of the same data frame, and must be rejoined at a receiver.

Referring now to FIG. 6, in another embodiment of the present disclosure, a field 320 in the header 314 will specify the number of segments in the packet 300, K. At the beginning of each segment or payload 316, another information field will contain length 322, modulation and coding scheme 324 as well as the existence of FCS 326 (FCS ex.) and midamble 328 (Midam. Ex.). Furthermore, another information element (CONT) 330 may exist that determines whether two consecutive segments are portions of the same data frame, and must be rejoined at the receiver.

Figure 7:
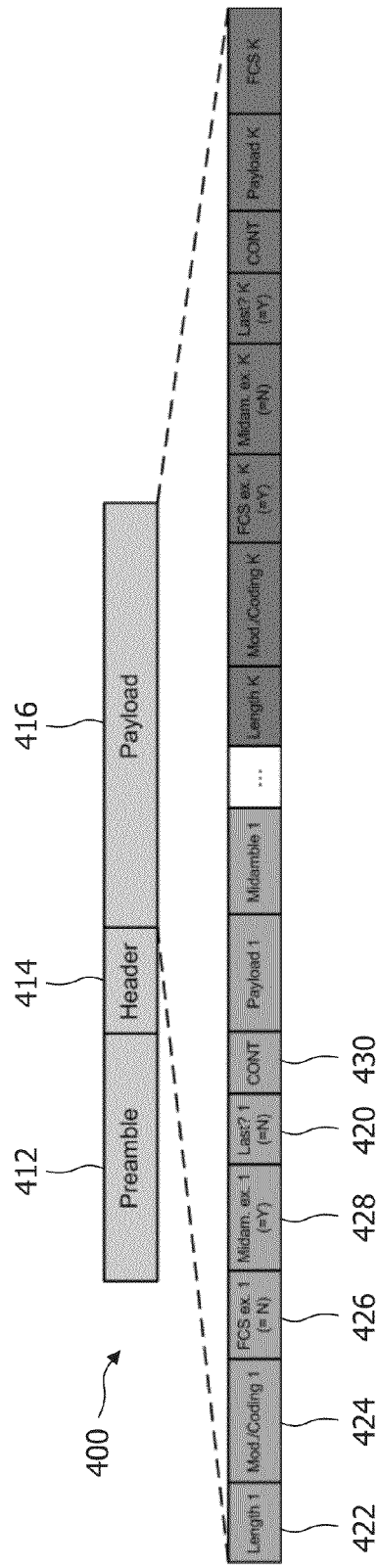
FIG. 7 is an illustration of a data packet structure in accordance with a further embodiment of the present disclosure.

In yet another embodiment of the present disclosure, at the beginning of each segment or payload 416, an information field will contain length 422, modulation and coding scheme 424 as well as the existence of FCS 426 (FCS ex.) and midamble 428 (Midam. Ex.) as shown in FIG. 7. Furthermore, another information element (CONT) 430 may exist that determines whether two consecutive segments are portions of the same data frame, and must be rejoined at the receiver. In each of these information fields, one information element 420 will determine whether this is the final segments or if another segment is following.

The techniques of the present disclosure can be applied to many data and multimedia transmissions when different types of source data maybe available, and the bandwidth efficiency is important. Particularly, it can be applied to the multi gigabit 60 GHz communication links carrying multimedia and data.

Although embodiments which incorporate the teachings of the present disclosure have been shown and described in detail herein, those skilled in the art can readily devise many other varied embodiments that still incorporate these teachings. Having described preferred embodiments for a system and method for efficient transmission of multimedia and data in the same packet (which are intended to be illustrative and not limiting), it is noted that modifications and variations can be made by persons skilled in the art in light of the above teachings. It is therefore to be understood that changes may be made in the particular embodiments of the disclosure disclosed which are within the scope and spirit of the disclosure as outlined by the appended claims. Having thus described the disclosure with the details and particularity required by the patent laws, what is claimed and desired protected by Letters Patent is set forth in the appended claims.

What is claimed is:

1. A data transmission system comprising:
a data transmitter configured to:
generate a packet including a preamble, header and a plurality of payloads;
insert in the packet a field designating a number of payloads included in the packet; and
insert in the packet at least one data field for each payload in the packet, the at least one data field defining characteristics of the payload including a modulation and coding scheme for the respective payload;
wherein the characteristics of the payload further include a continuation element indicative of whether two consecutive payloads are portions of a same data frame in the packet.

2. The data transmission system as in claim 1, wherein the at least one data field further includes at least one of a length of the payload, existence of a frame check sum (FCS), and existence of a midamble.

3. The data transmission system as in claim 1, wherein the field designating the number of payloads and the at least one data field are inserted in the header.

4. The data transmission system as in claim 1, wherein the field designating the number of payloads is inserted in the header and the at least one data field is inserted before each payload.

5. The data transmission system as in claim 1, wherein the at least one data field determines whether the payload is the final payload of the packet.

6. A method for generating a data packet, the method comprising:
generating, by a data transmitter, said packet including a preamble, header and a plurality of payloads;
inserting in the packet a field designating a number of payloads included in the packet; and
inserting in the packet at least one data field for each payload in the packet, the at least one data field defining characteristics of the payload including a modulation and coding scheme for the respective payload;
wherein the characteristics of the payload further include a continuation element indicative of whether two consecutive payloads are portions of a same data frame in the packet.

7. The method as in claim 6, wherein the at least one data field further includes at least one of a length of the payload, existence of a frame check sum (FCS), and existence of a midamble.

8. The method as in claim 6, wherein the field designating the number of payloads and the at least one data field are inserted in the header.

9. The method as in claim 6, wherein the field designating the number of payloads is inserted in the header and the at least one data field is inserted before each payload.

10. The method as in claim 6, wherein the at least one data field determines whether the payload is the final payload of the packet.

11. A non-transitory computer readable medium having instructions stored thereon that, when executed by a processor, cause the processor to perform operations comprising:
generating a data packet including a preamble, header, and a plurality of payloads;
inserting a field designating a number of payloads included in the packet; and
inserting at least one data field for each payload in the packet, the at least one data field defining characteristics of the payload including a modulation and coding scheme for the respective payload, wherein the data packet is used for transmitting multimedia and data;
wherein the characteristics of the payload further include a continuation element indicative of whether two consecutive payloads are portions of a same data frame in the packet.

12. The non-transitory computer readable medium as in claim 11, wherein the at least one data field further includes at least one of a length of the payload, existence of a frame check sum (FCS), and existence of a midamble.

13. The non-transitory computer readable medium as in claim 11, wherein the field designating the number of payloads and the at least one data field are inserted in the header.

14. The non-transitory computer readable medium as in claim 11, wherein the field designating the number of payloads is inserted in the header and the at least one data field is inserted before each payload.

15. The non-transitory computer readable medium as in claim 11, wherein the at least one data field determines whether the payload is the final payload of the packet.

* * * * *